United States Patent Office 3,291,748
Patented Dec. 13, 1966

3,291,748
THORIUM SILICATE HYDROSOLS
Frederick T. Fitch and Jean G. Smith, Baltimore, Md., assignors to W. R. Grace & Co., a corporation of Connecticut
No Drawing. Original application May 12, 1960, Ser. No. 28,511, now Patent No. 3,159,583, dated Dec. 1, 1964. Divided and this application Feb. 4, 1964, Ser. No. 359,805
6 Claims. (Cl. 252—301.1)

This application is a division of application Serial No. 28,511, filed May 12, 1960, now U.S. Patent No. 3,159,-583.

This invention relates to heavy metal silicate sols with appreciable stability under extreme hydrothermal conditions. In one particular embodiment it relates to thorium silicate sols suitable for use in the fuel systems of aqueous homogeneous reactors.

Aqueous homogeneous reactors may be one of three types: Burner reactors, converter reactors or breeder reactors. Burner reactors are those in which fissionable materials are consumed as fuels but virtually no fuel is generated. Converter reactors are those which produce a different fissionable fuel from that which is destroyed in the fission process. Breeder reactors are those which produce more of the same type of fissionable fuel as is being consumed in the reactor. A converter reactor becomes a breeder reactor if there is a net gain in the production of fissionable fuel and this fuel is subsequently burned in the reactor.

The nuclear reactions involved in the breeder reactor using a mixed thoria-urania fuel are typical and are well known. In a two region reactor, for example, a core of uranium solution is surrounded by a blanket of thorium 232. As the uranium in the core fissions, it gives off neutrons, some of which are absorbed by the thorium 232 to convert it to thorium 233. Thorium 233 decays with a half life of 23.3 minutes to yield protactinium 233 which in turn decays to uranium 233. The uranium 233 is a fissionable uranium isotope and is itself a suitable fuel. These breeder reactors may also be designed as single region reactors which contain a homogeneous mixture of fissionable and fertile material in a moderator. These reactors differ from the single region reactor in that they have larger reactor diameters in order to minimize neutron losses. They normally contain the fuel plus fertile material in concentrations as high as 300 grams per liter.

Aqueous homogeneous reactors have several advantages over the conventional type of reactors used in nuclear power development. These advantages stem partly from the fluid nature of the fuels and partly from the homogeneous mixture in the moderator. The most obvious advantage of these systems resides in the high power density; that is, because of the homogeneous nature of the reactor fuel fluid, there is essentially no heat transfer barrier between the fuel and the coolant. These reactors also compare favorably with heterogeneous reactors in that the high burn-up of fuel is possible. Because the fuel is liquid, continuous removal of poisons that cause radiation damage to fuel elements is possible and new fuel can be continually added to the system thereby permitting unlimited burn-up. Neutron economy in the liquid fuel system is improved by eliminating the absorption of neutrons by the cladding and the structural materials which are present in the reactor core of the heterogeneous reactors. The design of these reactors makes possible rapid removal of fission product poisons.

In some of the reactor systems of the prior art, uranyl sulfate in aqueous solution is used as the fuel in aqueous homogeneous reactors. These solutions have not been particularly satisfactory as neutron sources because they are corrosive at temperatures of 250 to 300° C. and at these temperatures have been found to be unstable.

Slurries have certain obvious disadvantages as fuels in that they require constant agitation to prevent solids separation. The equipment also tends to be eroded by the movement of these solid particles in the fuel element of the reactor. Attrition is also frequently a problem in that these solid fuels tend to be subject to attrition in the operation of the reactor.

It has been recognized that these problems can be solved by using urania sols or thoria-urania sols as the fuel in aqueous homogeneous reactors of the type set out above. Sols have the advantage of being homogeneous fluids and have been found to avoid the disadvantages that are present where urania or thoria-urania slurries are used. These is, for example, no need to furnish agitation to prevent solids separation. Because of their small size, these particles are not subject to attrition and the problem of erosion of equipment becomes unimportant. Sols also have relatively low viscosities and thus can be easily pumped.

In accordance with the present invention, we have discovered that thorium silicate particles of desirable micelle size can be prepared as thorium silicate sols (and if expedient to do so, clad with a layer of silica) and the entire sol stabilized by the addition of an alkali metal hydroxide. The silica and alkali metal have desirably low neutron-capture cross-section and do not interfere with reactions involving the thorium. However, in order to obtain the desired characteristics, it is necessary that the various components be prepared in a carefully controlled manner and brought together in a specified order under likewise carefully controlled conditions.

In order to obtain a final thorium silicate sol of the necessary hydrothermal stability, low viscosity and other desirable properties, it is desirable that the thorium silicate particles be spheroidal or substantially so. In addition, the thorium silicate particles of the present invention should be preferably be of generally uniform size having a particle size generally less than about 300 millimicrons. Suitable silicate sols can be prepared by hydrolyzing concurrently a dilute thorium salt and an organic silicate while maintaining the system at an elevated temperature.

This procedure is essentially a co-hydrolysis in which both hydrolysis reactions are proceeding concurrently and are interacting. Thus, thorium in the plus IV oxidation state is being hydrolyzed under conditions that normally give thoria, and an organic silicate is being hydrolyzed under conditions that normally give silica. When both of these hydrolysis reactions are proceeding concurrently, the path of the reaction is changed and instead of thoria and silica being obtained as the products, a very stable compound, thorium orthosilicate ($ThSiO_4$), results. The interaction of the various intermediate products of both hydrolyses must occur under the proper conditions and rates. The thorium orthosilicate product is colloidal.

The hydrolysis of the thorium in the plus IV state may be accomplished by: (1) anion removal by electrodialysis, (2) urea hydrolysis, or (3) by using a dilute solution of thorium in the plus IV oxidation state in the presence of an organic silicate.

In the present process, we start with an aqueous solution of a thorium salt of a strong monobasic acid, preferably with a salt that is sufficiently soluble that the dialysis or direct reaction with an organic orthosilicate will proceed satisfactorily. Thorium nitrate, thorium chloride and thorium perchlorate are suitable for this purpose. The chlorides, however, exhibit a tendency toward being corrosive at elevated temperatures and, therefore, the chloride content should be reduced as much as possible. For this reason, if the thorium silicate sol, for example, is being prepared to be used for a reactor blanket, it is normally preferred to use thorium nitrate in the reaction with the organic silicate. Trace nitrate impurities which might remain in the sol are not as harmful as comparable amounts of chlorides would be. Thorium silicate sols prepared by any of the foregoing techniques are characterized by relatively dense, generally spherical particles having colloidal dimensions and exhibiting little tendency to agglomerate at ambient temperatures. The hydrothermal stability at elevated temperatures of these thorium silicate sols may be improved by coating the thorium silicate sols with silica. The hydrolysis is normally carried out at reflux temperature but the reaction would proceed satisfactorily at temperatures from about 70 to about 150° C.

The generally spherical, colloidal, densified thorium silicate particles prepared as described above can be clad with a protective layer of silica, whenever it is expedient to do so, by simply adding a slight excess of the organic silicate after the silicate is formed, heating until hydrolyzed, and stabilizing by maintaining a prescribed pH by adding alkali hydroxides as needed.

Since neutron-capture is a nuclear process dependent on atomic concentration and since silicon is a relatively light element having an atomic weight of only 28 as compared to an atomic weight of 232 for thorium, the thoria to silica ratio should be as high as possible. However, even in ratios as low as 1:1, the presence of silicon does not reduce the efficiency excessively because its thermal neutron-capture cross-section, that is, its tendency toward neutron-capture, is, for example, only 0.13 barn as compared with 7.0 barns for thorium. Thus, in a thoria to silica weight ratio of 1:1 (atomic ratio of 0.227:1) the silicon will capture only about 8% of the neutrons and the thorium will capture 92%; at a 3:1 ratio the silica will capture only about 2.7%.

The specific conductance is generally used as a measure of the anionic impurities and should be kept below $10^{-3}$ mhos/cm. in the final product.

Where the anion content is high enough to get an undesirable product, further purification is normally carried out. This purification can best be effected by heating the alkali sol under non-evaporative conditions, that is, under total reflux or in an autoclave to insure release of the anions from the micelles and then contacting with a deionizer to remove the electrolytes. If the alkali metal ions are removed, the alkalinity must be restored by adding more alkali metal hydroxide. The resulting pH should be from about 7.0 to about 9.5. Thus, except for the stabilizing alkali metal cations, the resulting solution is substantially electrolyte free.

Since sols of this type tend to coagulate, often irreversibly, in the presence of electrolytes, care must be taken to keep the electrolyte content at a minimum. A convenient method of measuring concentration of the undesired ionic material is specific conductance. For the sols of the present invention, specific conductance will usually range between $10^{-3}$ and $10^{-6}$ mhos/cm. The stability of any given sol is improved by reduction in the ionic content; therefore, specific conductances in the lower part of the range are preferred.

The sol prepared as described can be concentrated by evaporation to a solids content of up to 45% total solids in the usual case. It is preferred to add fresh sol continuously during evaporation to avoid deposition of the solid material on the sides of the vessel. The finished sol may be diluted to any lower solids content by the addition of deionized water or water of low ionic content.

Specific conductance is measured at 25° C. and one kilocycle using a standard conductivity bridge with a cell inserted in one arm. The cell constant is determined using KCl solutions of 0.01 normality (the conductance of which is ascertained from the conductivity tables) and using the equation $$K = L_{KCl} R$$

where $K$ = cell constant in cm.$^{-1}$
$R$ = bridge resistance in ohms
$L$ = specific conductance in mhos/cm. of the standard KCl solution The conductance L of the sol in question can be determined by measuring its resistance in the same cell and using the equation $$L_{sol} = K/R$$

where $K$ = cell constant in cm.$^{-1}$
$R$ = resistance in ohms

The thorium content of our sols was determined by fluorescent X-ray spectroscopy and by standard gravimetric techniques. Electron micrographs were made by the standard techniques.

In the present disclosure, we have referred to the use of alkali metal hydroxides and, specifically, to sodium hydroxide although other preparations may be used. The only limitations in the selection of the base resides in the fact that the base should be composed of low thermal neutron cross-section elements and be stable under reactor conditions.

In referring to our dispersions of thorium silicate in water, we intend to include heavy water as well as natural water.

In referring to organic orthosilicates, we mean to include organic compounds which will produce silica on hydrolysis. Suitable compounds include various alkoxy silanes, preferably with alkoxy groups smaller than butoxy, in order that the compound be not too resistant to hydrolysis. The preferred compound is ethyl orthosilicate due both to suitable hydrolysis rates and availability.

The hydrolysis will proceed satisfactory if the number of moles or organic silicate present in the solution is about equal to or slightly in excess of the number of moles of the thorium salt present.

While our invention is primarily concerned with the preparation of thorium silicate sols, the process disclosed should be considered applicable to other metal salts hydrolyzing at low pH such as aluminum, iron, titanium, zirconium, uranium, plutonium, etc.

The present invention will be further explained by the following illustrative but non-limiting examples.

EXAMPLE I

A charge of 1760 grams of a thorium nitrate solution containing 5% $ThO_2$ in deionized water was placed in a vessel, hereinafter designated as a densification vessel, and heated to 97.8° C. The solution was circulated at a rate of approximately 60 cc. per minute through a water cooler to reduce the temperature to 30–40° C. and then through the cathode compartment of a cell divided by an ion exchange membrane of Amberplex Al. The electrode compartments each had a capacity of 350 cc. and each was equipped with a stirrer. Platinum electrodes were positioned on each side of the membrane at a distance of about 1/8 inch from the membrane.

Small quantities of ethyl orthosilicate were added to the densification vessel over the period of the run. A total of 110 ml. of ethyl orthosilicate was added in 5 and 10 ml. increments over an eight hour period. The temperature of the densification vessel was maintained at 97 to 98° C. to minimize the ethyl orthosilicate vapor loss. The solution leaving the cathode cell was passed through a heat exchanger where it was heated to 97 to 98° C. and then returned to the densification vessel. Evaporation losses were minimized by equiping the cell with a condenser and by periodically adding deionized water to take care of unavoidable losses.

Circulation of the solution was continued over a total period of 10.5 hours with overnight interruptions at eight-hour intervals during which period the solution was cooled to room temperature. During electrolysis, the amperage dropped from 10 to a value of about .4 and the pH rose from 2.7 to about 4.6. The sol (1752 g.) had a density of 1.04 grams/cc., a pH of 3.6, a specific conductance of $9.6 \times 10^{-4}$ mhos/cm. and contained 4.02% $ThO_2$ and 1.11% $SiO_2$. In this condition, the sol was stable at 150° C. The electron diffraction pattern of this sol was identified as that of thorite, a thorium orthosilicate.

Electron micrographs revealed well distributed particles having a weight medium in the range of 100 m$\mu$.

To 500 grams of the above sol, 12.7 grams of additional ethyl orthosilicate, sufficient to bring the $SiO_2/ThO_2$ ratio of the system to 2.2, was added. The addition was followed by 36 hours of refluxing after which the pH was adjusted to a pH of .9 with a 1 normal solution of sodium hydroxide. After refluxing for an additional 24 hours, the sol was deionized by passing it through a mixed bed resin and the pH was adjusted to 8.2 by the addition of a 1 normal solution of sodium hydroxide. The sol was autoclaved for 24 hours at 150° C. The thoria concentration was determined at this point (density 1.20) and found to be 11.1%. The sol was deionized for the second time to reduce the specific conductance. After the pH was adjusted to 8, the specific conductance was found to be $2.5 \times 10^{-4}$ mhos/cm. The sol was autoclaved at 275° C. for various periods of time in order to determine its hydrothermal stability.

A sample of the above sol was treated by centrifuging and redispersing into deionized water to yield a sol having a density of 1.32, a pH of 3.1, and a specific conductance of $1.28 \times 10^{-3}$ mhos. In this condition, the sol was stable for at least 140 hours at a temperature of 275° C. The results of these tests together with some of the physical characteristics of the sol are given in Table I below.

*Table I*

Density at 25° C. (grams/ml.) _____ 1.18
pH _____ 8.0
Specific conductance (mhos/cm.) _____ $2.5 \times 10^{-4}$
Hydrothermal stability at 275° C. Stable for at least 200 hrs.

EXAMPLE II

This example shows another method of preparing a thorium silicate sol suitable for use in the fuel system of an aqueous homogeneous reactor.

A charge of 21.3 grams (.038 mole) of thorium nitrate $Th(NO_3) \cdot 4H_2O$, 4.6 grams (.076 mole) of urea and 7.9 grams (.038 mole) of ethyl orthosilicate was added to a two liter flask with 966 grams of water. These components were refluxed for 16 hours at 100° C. The product, an opaque white sol, was removed from the reactor and submitted for electron microscope study. An electron diffraction pattern for thorite was obtained for the sol. The sol was autoclaved at 275° C. to determine its hydrothermal stability. The results of these tests together with some of the physical characteristics of the sols prepared in this manner are given in Table II below.

*Table II*

Percent $ThO_2$ (by density) _____ ~10
Density at 25° C. (grams/ml.) _____ 1.11
pH _____ 9.6
Hydrothermal stability at 275° C. Stable for at least 128 hrs.

EXAMPLE III

A thorium silicate sole was prepared using a third process.

A charge of 21.3 grams of thorium nitrate $$Th(NO_3)_4 \cdot 4H_2O$$

and 7.9 grams of ethyl orthosilicate were added to a two liter flask together with 971 grams of water. The mixture was refluxed at 100° C. for 16 hours. At the end of this period, the slurry was removed and a sample submitted for electron microscope study. The sol gave an electron diffraction pattern for thorite. The results of these tests together with some of the physical characteristics of this and other sols prepared by the same technique are given in Table III.

*Table III*

Percent $ThO_2$ (by method of preparation) _____ 1
Density at 25° C. (grams/ml.) _____ 1.00
pH _____ 9.7

Obviously many modifications and variations of the invention as hereinabove set forth may be made without departing from the essence and scope thereof and only such limitations should be applied as are indicated in the appended claims.

We claim:
1. An aqueous thorium silicate sol stable at temperatures up to at least 150° C. comprising a homogeneous dispersion in water of generally spheroidal, densified particles of thorium silicate having a particle size in the range of 200 to 3000 Angstrom units.

2. A stabilized thorium silicate sol comprising a dispersion of thorium silicate particles in water wherein the particles have the diffraction pattern of thorite.

3. A stable silica-coated thorium silicate sol comprising a dispersion of thorium silicate particles in water stabilized by an alkali metal hydroxide.

4. A hydrothermally stable sol of thorium silicate particles in association with sufficient silica to impart a coating about 30 to about 300 Angstroms thick thereto and containing sufficient alkali metal hydroxide to give a pH of above 7 but below about 9.5.

5. A hydrothermally stable thorium silicate sol comprising an aqueous homogeneous dispersion of about 5 to 50 weight percent of said silicate particles of generally spheroidal shape and having a particle size in the range of about 200 to 3000 Angstrom units and having a coating of unreactive hydrous silica about 30 to 300 Angstroms thick and containing sufficient sodium hydroxide to give a pH of 7 to 9.5 and having a specific conductance at 25° C. of about $10^{-3}$ to $10^{-6}$ mhos/cm.

6. As a composition of matter, a sol of finely divided thorite particles having a particle size in the range of about 200 to 3000 Angstrom units, having a solids content in the range of about 5 to 50%, and having a specific conductance at 25° C. of about $10^{-3}$ to $10^{-6}$ mhos/cm.

References Cited by the Examiner

UNITED STATES PATENTS 2,892,797    5/1959    Alexander et al. _____ 252—313
2,995,529    8/1961    Smith-Johannsen __ 252—313 X

OTHER REFERENCES

Mellor: Comprehensive Treatise on Inorganic and Theoretical Chemistry, vol. 6, p. 859 (1925).

Weisler: Colloidal Salts, 1st ed., pp. 323–324 (1928).

CARL D. QUARFORTH, *Primary Examiner.*

LEON D. ROSDOL, *Examiner.*

L. A. SEBASTIAN, *Assistant Examiner.*